(12) United States Patent
Ueda et al.

(10) Patent No.: US 6,407,039 B1
(45) Date of Patent: Jun. 18, 2002

(54) BIODEGRADABLE, WEED-PREVENTING SHEET AND A METHOD OF PREVENTING GENERATION AND GROWTH OF WEEDS BY USE OF THE SAME

(75) Inventors: Toshiya Ueda; Motoyoshi Nishimura, both of Osaka (JP)

(73) Assignee: K.K. Ueda Shikimono Kojyo, Osaka (JP)

( * ) Notice: Subject to any disclaimer, the term of this patent is extended or adjusted under 35 U.S.C. 154(b) by 0 days.

(21) Appl. No.: 09/705,357

(22) Filed: Nov. 3, 2000

(30) Foreign Application Priority Data

May 17, 2000 (JP) .......................................... 2000-144684

(51) Int. Cl.$^7$ ............................. A01N 3/02; A01N 63/00
(52) U.S. Cl. ....................................... 504/116; 504/117
(58) Field of Search ................................... 504/117, 116

(56) References Cited

U.S. PATENT DOCUMENTS 3,958,365 A * 5/1976 Proctor ........................... 47/34
6,070,358 A * 6/2000 Meikle et al. .................. 47/56

FOREIGN PATENT DOCUMENTS

| JP | 6-280230 | 10/1994 |
| JP | 8-103177 | 4/1996 |
| JP | 8-187804 | 7/1996 |
| JP | 9-74905 | 3/1997 |
| JP | 9-99980 | 4/1997 |
| JP | 9-248070 | 9/1997 |
| JP | 10-42720 | 2/1998 |
| JP | 10-84791 | 4/1998 |
| JP | 10-178933 | 7/1998 |
| JP | 10-262472 | 10/1998 |
| JP | 11-229260 | 8/1999 |

* cited by examiner

*Primary Examiner*—Alton Pryor
(74) *Attorney, Agent, or Firm*—Jordan and Hamburg LLP

(57) ABSTRACT

The present invention provides a biodegradable, weed-preventing sheet comprising biodegradable fibers, and a method of preventing generation and growth of weeds using the sheet. The sheet contains coconut fibers as constituent fibers, exhibits naturally mild and slow biodegradability, and does not adversely affect the environment. Further, when the effect of the sheet becomes insufficient because of biodegradation during use, a new biodegradable, weed-preventing sheet can be laid thereon and used without adversely affecting the environment. Further, the sheet has significantly improved weatherability, durability and mechanical strength. Accordingly, the sheet resists breakage due to its mechanical strength. It has excellent light-shielding properties and suitable water permeability. The sheet is not cleaved by the growing force of vigorously growing plants of the Gramineae family. The sheet is also resistant to breakage by dogs and digging by mice and is impenetrable by weed seeds.

35 Claims, No Drawings

BIODEGRADABLE, WEED-PREVENTING SHEET AND A METHOD OF PREVENTING GENERATION AND GROWTH OF WEEDS BY USE OF THE SAME

BACKGROUND OF THE INVENTION

The present invention relates to a biodegradable, weed-preventing sheet having naturally mild and slow biodegradability. It has extremely high weatherability, durability and light-shielding properties. It also has suitable water permeability, high mechanical strength and is resistant to breakage by dogs, cats, digging by mice and invasion by weed seeds.

The conventional weed-preventing sheet has been used for preventing growth of weeds by directly laying the sheet in the culture ground such as orchards and kitchen gardens, or used for preventing growth of weeds in order to keep the beauties of parks, gardens, residential lands and roadsides trees, or used for surface treatment of an embankment normal in development of roads and shore protection works.

Generally, as a means of preventing growth of weeds, there is a means of laying a colored synthetic resin film in the ground to stop sunlight completely and water necessary for growth of plants. However, such a film for completely stopping water, when used against roots of plants, does not permit passage of rainwater thus causing drying of the soil, which may result in withering of cultivated plants as well, while the film does not permit evaporation and discharge of rainwater so that puddles occur between the film and the ground surface, and roots seeking the water in these puddles float just below the ground surface, resulting in spoiling roots and preventing growth of cultivated plants.

Further, there arises the problem that if such a synthetic resin film is used for surface treatment of an embankment normal in development of roads and shore protection works, water retained between the film and the ground surface may cause flowing of underground earth and sand to generate a cave-in, or an outflow of topsoil from the site of shore protection works.

Further, there is the problem that the synthetic resin film is generally inferior in mechanical strength such as tear strength, tensile strength and piercing strength so that the film may be broken by mechanical strength upon surface treatment of an embankment normal or upon stretch for construction, or cleaved by the growing force of vigorously growing plants of Gramineae family represented by Japanese pampas grass.

In addition, a frequently used synthetic resin film such as colored polyolefin film, colored polyvinyl chloride film etc. hardly undergoes biodegradation, thus causing a deterioration in the environment, necessitating enormous costs for post-treatment of the film after use, and upon combustion, causing secondary disasters, such as breakage of an incinerator and generation of dioxin.

In place of the synthetic resin film, a water-permeable weed-preventing sheet using non-woven fabric, woven fabric or knit article made of polyolefin-based fibers or polyvinyl chloride-based fibers has also been proposed, but both the polyolefin-based fibers and polyvinyl chloride-based fibers are hydrophobic, and when voids in this water-permeable weed-preventing sheet are small, water cannot pass through the sheet because of surface tension, and water thus retained may cause the same problems as in the synthetic resin film described above, while when the voids are made larger, the light-shielding properties are lowered, and because of penetrating light, the sheet fails to achieve a sufficient effect of preventing growth and overgrowth of weeds.

Under these circumstances, there has been proposed a biodegradable, weed-preventing sheet formed from non-woven fabric consisting of biodegradable and thermoplastic aliphatic polyester fibers, wherein the fineness of single yarn in the polyester fibers is 1 to 15 denier, and the weed-preventing sheet has a weight ranging 50 to 300 g/m$^2$, has a light shielding degree of 95% or more, and has a water permeation coefficient of 0.02 to 0.8 cm/sec. (JP-A 11-229260).

As the thermoplastic aliphatic polyester in this case, a polymer selected from poly(D-lactic acid), poly(L-lactic acid), a D-lactic acid-L-lactic acid copolymer, a D-lactic acid-hydroxycarboxyhc acid copolymer, and a blend thereof, is mentioned.

However, this biodegradable, weed-preventing sheet is formed from a polymer selected from poly(D-lactic acid), poly(L-lactic acid), a D-lactic acid-L-lactic acid copolymer, a D-lactic acid-hydroxycarboxylic acid copolymer, and a blend thereof. Hence, the biodegradability of this sheet is varied depending on the degree of polymerization or raised by hydrolysis of ester linkages by bacteria, causing poor durability and permitting growth and overgrowth of weeds at its biodegraded site. By the growing force of these weeds, the biodegradable weed-preventing sheet is further cleaved, and more weeds grow and overgrow at that site, so the role of the biodegradable weed-preventing sheet is rapidly lost.

Accordingly, the biodegradable weed-preventing sheet must be exchanged frequently with new one, and this is a very troublesome and costly operation. There are further troublesome tasks for estimating the timing of exchange and for grasping the state of the laid biodegradable weed-preventing sheet.

Further, this biodegradable weed-preventing sheet is formed from D-lactic acid and L-lactic acid, and these are expensive and also problematic from the viewpoint of durability.

The present invention was made to solve the problems described above. The present inventors paid attention to the fact that biodegradable fibers containing coconut fibers have mild and slow biodegradability in the environment as well as excellent durability, and they found that a sheet formed from such biodegradable fibers containing coconut fibers can work as a biodegradable weed-preventing sheet exhibiting sufficient lightshielding properties, mechanical strength, and suitable water permeability for a prolonged period of time, and on the basis of this finding, the present invention was completed.

SUMMARY OF THE INVENTION

That is, a sheet which has been formed from biodegradable fibers containing g coconut fibers as essential constituent fibers according to the present invention can exhibit naturally mild and slow biodegradability, and do not adversely affect the environment during use and when left after use. Further, when the effect of preventing generation and growth of weeds becomes insufficient because of the progress of biodegradation during use, a new biodegradable weed-preventing sheet can be laid thereon and used successively without adversely affecting the environment. Further, this sheet has significantly improved weatherability, durability and mechanical strength and can thus endure mechanical stress upon surface treatment of an embankment normal and upon a stretch of construction. As a result, the film is not broken by such mechanical stress, has excellent lightshielding properties and suitable water permeability, is not cleaved by the growing force of vigorously growing plants of Gramineae family represented by Japanese pampas grass, is resistant to breakage by dogs, cats, digging by mice, and invasion by weed seeds. The object of the present invention is to provide such a biodegradable weed-preventing sheet capable of preventing generation and growth of weeds as well as a method of preventing generation and growth of weeds by use of said sheet.

To achieve the object, the biodegradable weed-preventing sheet of the present invention comprises biodegradable fibers containing coconut fibers as essential constituent fibers formed in the form of sheet (hereinafter, this sheet is referred to as the first weed-preventing sheet of the present invention).

In the first weed-preventing sheet of the present invention, the biodegradable fibers are formed preferably from a fiber blend consisting of coconut fibers whose content is 30% by weight or more and other biodegradable fibers, and in this case, the content of the coconut fibers in the biodegradable fibers is preferably 50% by weight or more, more preferably 75% by weight or more.

The reason that the content of the coconut fibers in the biodegradable fibers is 30% by weight or more in the first weed-preventing sheet of the present invention is that among vegetable fibers described below, the coconut fibers have particularly high weatherability, durability and mechanical strength and exhibit slow biodegradability, and thus when 30 weight % or more of coconut fibers are contained in the biodegradable fibers, weatherability, durability and mechanical strength are increased, thus providing a biodegradable weed-preventing sheet capable of preventing generation and growth of weeds for a period 2.5 times or more as long as that by other vegetable fibers, particularly 5 times or more depending on the conditions (high-temperature-highly humid area) where the sheet is used.

Accordingly, the first weed-preventing sheet of the present invention comprises biodegradable fibers composed particularly of coconut fibers in the form of sheet, most preferably biodegradable fibers composed exclusively of coconut fibers.

That is, the coconut fibers can exhibit naturally mild and slow biodegradability, and do not adversely affect the environment during use and when left after use. Further, when the effect of preventing generation and growth of weeds becomes insufficient because of the progress of biodegradation during use, a new biodegradable weed-preventing sheet can be laid thereon without adversely affecting the environment. Further, this sheet has significantly improved weatherability, durability and mechanical strength and can thus endure mechanical stress upon surface treatment of an embankment normal and upon a stretch of construction. As a result, the film is not broken by such mechanical stress, has excellent lightshielding properties and suitable water permeability, is not cleaved by the growing force of vigorously growing plants of Gramineae family represented by Japanese pampas grass, is resistant to breakage by dogs, cats, digging by mice, and invasion by weed seeds, thus preventing generation and growth of weeds.

DETAILED DESCRIPTION OF THE INVENTION

Hereinafter, a biodegradable weed-preventing sheet of the present invention is described in detail.

In the first weed-preventing sheet of the present invention, other biodegradable fibers are at least one kind of fibers selected from natural or synthetic biodegradable fibers other than coconut fibers, and how the natural or synthetic biodegradable fibers other than coconut fibers are selected is determined in consideration of the region where the sheet is used, as well as the conditions of climate, rainfall, temperature etc.

In the first weed-preventing sheet of the present invention, the biodegradable fibers are fibers to be degraded by living things such as microorganisms and small animals under natural conditions, and in the present invention, synthetic fibers such as polyolefin type fibers, polyamide type fibers, acrylic type fibers, polyester type fibers, polyurethane type fibers and ethylene-vinyl acetate type copolymers, regenerated fibers such as viscose rayon, Bemberg and spun rayon thereof, semi-synthetic fibers such as acetate and spun rayon thereof and chinon (promix) can be mixed if desired in an amount of 20% by weight or less, more preferably 15% by weight or less, particularly preferably 10% by weight or less of the total of the biodegradable fibers, and these amounts of the fibers do not significantly adversely affect the environment.

Further, the natural fibers other than coconut fibers are at least one member selected from vegetable and animal fibers selected from cotton, kapok, jute hemp, manila hemp, sisal hemp, silk, camel hair, alpaca, wool, mohair or cashmere, and the synthetic biodegradable fibers described above are not particularly limited insofar as they are synthetic biodegradable fibers, and specific examples are the known ones described above.

In the first weed-preventing sheet of the present invention, the method of forming a sheet of the biodegradable fibers containing coconut fibers is not particularly limited. Specifically, the biodegradable fibers may be formed into non-woven fabric, woven fabric or knitted webs thereby constituting a sheet, or the biodegradable fibers may be cemented mutually via a cementing material made of a polymeric material, to form a sheet, or the biodegradable fibers may stitched or knitted to form a sheet.

The method of forming the biodegradable fibers into non-woven fabric, woven fabric or knitted web is not particularly limited, and any known methods can be used. Specifically, it is possible to use woven fabric consisting of plain weave, twill fabric, leno weave, twist weave and a combination thereof, weft-knitted fabric, warp-knitted fabric, and laminated non-woven fabric comprising warps and wefts laminated and cemented therein. In the present invention, the method of forming a sheet of the biodegradable fibers by cementing them via a cementing material made of a polymeric material is preferable because the fibers can be. easily formed into a sheet.

This cementing material made of a polymeric material includes hot-melt type resin and rubber for cementing the biodegradable fibers mutually.

Specifically, the natural cementing material includes e.g. starch-based cementing materials such as wheat starch and dextrin, protein-based cementing materials such as glue and casein, natural rubber-based cementing materials such as latex, while the synthetic cementing materials include vinyl acetate-based cementing materials, polyvinyl alcohol-based cementing materials, polyvinyl acetate-based cementing materials, vinyl chloride-based cementing materials, acrylic cementing materials, polyamide-based cementing materials, polyethylene-based cementing materials and cellulose-based cementing materials, polyaromatic thermosetting cementing materials such as urea-based cementing materials, melamine-based cementing materials, phenol-based cementing materials, resorcinol-based cementing materials, epoxy-based cementing materials, polyesterbased cementing materials and polyurethane-based cementing materials, and synthetic rubber cementing materials such as chloroprene-based cementing materials, nitrile rubber-based cementing materials, styrene rubber-based cementing materials, polysulfide-based cementing materials, butyl rubber-based cementing materials and silicone rubber-based cementing materials.

Among these cementing materials made of polymeric materials, the natural rubber-based cementing materials and synthetic rubber-based cementing materials are particularly preferable in the first weed-preventing sheet of the present invention because of high adhesion, high weatherability, durability and mechanical strength, and the adhesion maintained in the presence of water etc.

Further, in the first weed-preventing sheet of the present invention, the cementing material made of a polymeric material may be blended as necessary with ordinarily used additives such as inorganic fillers, antioxidants, UV absorbers, light stabilizers, lubricants, pigments, flame retardants and adhesion improvers.

When the first weed-preventing sheet of the present invention is prepared by cementing the biodegradable fibers via the cementing material of a polymeric material, the type and amount of the cementing material used is not particularly limited insofar as the biodegradable fibers can be mutually cemented and not broken during use or during handling, and these are suitably determined depending on the type of the biodegradable fibers used, the basis weight of the biodegradable weed-preventing sheet, and particularly the conditions (area and place, season, weather, rainfall, temperature etc.) under which the biodegradable weed-preventing sheet is used.

Generally, the amount of the cementing material made of a polymeric material is about 10 to 200 parts by weight, preferably about 15 to 150 parts by weight, particularly preferably 20 to 100 parts by weight relative to 100 parts by weight of the biodegradable fibers, so that the biodegradable fibers may be mutually cemented.

If the amount of the cementing material is less than 10 parts by weight relative to 100 parts by weight of the biodegradable fibers, neither sufficient adhesion among the fibers nor desired durability cannot be achieved so that the fibers are divided into pieces during use or during handling, whereas if the amount of the cementing material exceeds 200 parts by weight, the weight of the biodegradable weed-preventing sheet is increased to make handling inconvenient, while water permeability is deteriorated thus spoiling roots and drying the ground, the cost may be raised, and the biodegradability may be deteriorated.

In the first weed-preventing sheet of the present invention, the basis weight and thickness of the biodegradable weed-preventing sheet described above are not particularly limited, and may be varied and selected suitably depending on the conditions (area and place, season, weather, rainfall, temperature etc.) under which the biodegradable weed-preventing sheet is used. However, in consideration of weatherability, durability and mechanical strength and from the viewpoint of water permeability, lightshielding properties and handling properties, the basis weight is preferably about 500 to 4000 g/m$^2$, preferably about 1000 to 3000 g/m$^2$, particularly preferably about 1250 to 2500 g/m$^2$, and the thickness is about 3 to 50 mm, preferably about 5 to 35 mm, more preferably about 7.5 to 30 mm.

In this case, the water permeability, light-shielding properties and handling properties in addition to weatherability, durability and mechanical strength are regulated as desired by controlling the basis weight and thickness. If the basis weight is less than 500 g/m$^2$, the desired weatherability, durability or mechanical strength may not be achieved, water permeability may be raised, and the light-shielding properties may be insufficient, while if the basis weight is more than 4000 g/M$^2$, the weight of the weed-preventing sheet is too high thus deteriorating handling properties and further the cost is raised.

If the thickness is less than 3 mm, various characteristics such as sufficient light-shielding properties, mechanical strength and durability may not be achieved, but also invasion by weeds is hardly prevented, whereas a thickness of more than 50 mm is not preferable either because the weed-preventing sheet becomes bulky and the transferability and handling of the sheet are deteriorated.

To achieve the desired object of preventing growth of weeds, the first weed-preventing sheet of the present invention is prepared so as to show a degree. of light shielding of 85% or more in a light shielding test, that is, a method of Japan Chemical Fibers Examination Association, in which a light cell luminometer TOPCON, IM-3 Model, is set at 10,000 Lux in the absence of a sample and then a sample is set and measured for the degree of light shielding. The weed-preventing sheet thus prepared can be laid in the ground surface to shield sunlight effectively thus preventing the growth of weeds.

To achieve the object described above, another biodegradable, weed-preventing sheet of the present invention (referred to hereinafter as the second weed-preventing sheet of the present invention) comprises a layer of biodegradable fibers containing coconut fibers as essential constituent fibers laminated on one or both sides of a biodegradable base cloth thereby forming a sheet.

Further, a further other biodegradable, weed-preventing sheet of the present invention (referred to hereinafter as the third weed-preventing sheet of the present invention) comprises a layer of biodegradable fibers containing coconut fibers as essential constituent fibers interposed between biodegradable base cloths thereby forming a sheet.

In the second and third weed-preventing sheets of the present invention, the same biodegradable fiber layer as in the first weed-preventing sheet of the present invention described above, that is, at least-one member selected from non-woven fabric, woven fabric and knitted webs composed of biodegradable fibers can be used as said layer. Hence, a fiber blend consisting of coconut fibers in an amount of 30% by weight or more and other biodegradable fibers can be used preferably as the biodegradable fibers in the second and third weed-preventing sheets of the present invention. The other biodegradable fibers include at least one kind of fibers selected from natural or synthetic biodegradable fibers other than coconut fibers, but because these are the same as in the first weed-preventing sheet of the present invention, their description is omitted.

In the second and third weed-preventing sheets of the present invention, the natural fibers other than coconut fibers include at least one member selected from vegetable and animal fibers selected from cotton, kapok, jute hemp, manila hemp, sisal hemp, silk, camel hair, alpaca, wool, mohair or cashmere.

Further, the sheet formed from coconut fibers as the biodegradable fibers in the form of sheet, that is, the sheet consisting exclusively of coconut fibers as the biodegradable fibers in place of the biodegradable fibers containing coconut fibers as essential constituent fibers in the second and third weed-preventing sheet of the present invention is most preferable for the same reason as in the first weed-preventing sheet of the present invention.

That is, the other biodegradable weed-preventing sheet of the present invention preferably comprises a layer of biodegradable fibers consisting of coconut fibers laminated on one or both sides of a biodegradable base cloth thereby forming a sheet, or a layer of biodegradable fibers consisting of coconut fibers interposed between biodegradable base cloths thereby forming a sheet.

The method of laminating the layer of biodegradable fibers on the biodegradable base cloth is not particularly limited. Specifically, the layer of biodegradable fibers is laid on the biodegradable base cloth and may then be compressed by punching or pressing to intertwine the fiber nets mutually, or the biodegradable fibers and the biodegradable base cloth may be cemented via the above-described polymeric material to form a laminate structure, or these fibers (strings) may be fastened to one another by weaving, knitting etc., and in this case, coconut fibers are desirably used for improving strength.

The biodegradable base cloth includes at least one member selected from non-woven fabric, woven fabric and knitted webs formed from biodegradable fibers, and this biodegradable base cloth is made preferably of a natural material, and particularly, this natural material is desirably the one having slow biodegradability.

This natural material is at least one member selected from vegetable and animal fibers selected from coconut fibers, cotton, kapok, jute hemp, manila hemp, sisal hemp, silk, camel hair, alpaca, wool, mohair or cashmere, and in particular, vegetable fibers such as coconut fibers and animal fibers such as camel hair are preferable for demonstrating slow degradability.

Although the biodegradable base cloth described above is not particularly limited insofar as it can carry a layer of biodegradable fibers, its thickness is particularly 0.25 to 5 mm, preferably 0.5 to 3.5 mm, more preferably 0.75 to 2.5 mm, and its density is 1.25 to 5 times, more preferably 1.5 to 3.5 times, particularly preferably 1.75 to 3 times as high as the basis weight of the layer of biodegradable fibers.

In the present invention, the sheet is formed by laminating a plurality of layers each consisting of at least one kind of sheet selected from the biodegradable weed-preventing sheets, and for the same reason as in the first weed-preventing sheet of the present invention, its thickness and basis weight are regulated in the same range as in the first weed-preventing sheet of the present invention.

The biodegradable weed-preventing sheet of the present invention, when composed of a single layer, can exert a sufficient weed-preventing effect on almost all weeds, but depending the basis weight, the thickness and the conditions (area and place, season, weather, rainfall, temperature, etc.) under which the sheet is used, vigorously growing plants of Gramineae family represented by Japanese pampas grass may grow between gaps of the weed-preventing sheets. If the basis weight and thickness of the weed-preventing sheet are drastically increased for preventing this growth, the problem of handling may arise as described above.

By constituting the sheet in this manner, a further excellent biodegradable weed-preventing sheet can be obtained.

The method of laminating this biodegradable, weed-preventing sheet is not particularly limited. Specifically, the same method as in laminating the biodegradable fiber layer on the biodegradable base cloth as described above can be adopted.

In the biodegradable weed-preventing sheet of the present invention, a single sheet formed from biodegradable sheet, a single layer formed from biodegradable fibers, or plurality layers fastened to one another in the method described above, can be used.

In the present invention, the biodegradable weed-preventing sheet described above is preferably colored at least on the surface thereof.

By thus coloring the surface of the biodegradable weed-preventing sheet, the appearance of the sheet can be improved in order to improve an effect in design; during use, the time of exchanging the weed-preventing sheet can be easily confirmed by observing the degree of discoloration of the colored surface; the light-shielding properties can be improved; and the harmony thereof with the environment can be achieved.

The coloring agent in this case is not particularly limited and can be suitably selected depending on the conditions (area and place, season, weather, rainfall, temperature, etc.) under which the biodegradable weed-preventing sheet is used, but it is preferable to use a lipophilic coloring agent which is hardly washable with rainwater, etc.

The coloring agent described above is preferably a dyestuff such as acrylic dyestuff, and examples include organic pigments such as phthalocyanine-based pigments, cyanine-based pigments, styrene-based pigments, anthraquinone-based pigments, quinophthaline-based pigments, etc. as well as various dyestuffs and pigments including inorganic pigments such as carbon black, titanium black and titanium oxide. The amount of the coloring agent blended is in the range of 0.05 to 3% by weight, preferably 0.1 to 1.5% by weight of the whole of the biodegradable weed-preventing sheet.

In the present invention, the biodegradable base cloth and/or biodegradable fiber layer constituting the biodegradable weed-preventing sheet preferably has at least one member selected from salts such as sodium chloride, aluminum hydroxide, aluminum chloride, and natural brine etc. adhering thereto.

Salts such as sodium chloride and natural brine have the effect of inhibiting the growth of plants upon adhering to plants or by increasing salt concentration around roots, while aluminum salts such as aluminum hydroxide and aluminum chloride have the effect of inhibiting the growth of plants by inhibiting the respiration of roots and by inhibiting the functions of in vivo phosphates upon absorption into plants.

Accordingly, the biodegradable weed-preventing sheet of the present invention has at least one member selected from salts such as sodium chloride, aluminum salts such as aluminum hydroxide and aluminum chloride, and natural brine, adhering to the biodegradable base cloth and/or biodegradable fiber layer, whereby the growth of weeds can further be inhibited.

As the method of permitting salts such as sodium chloride, aluminum salts such as aluminum hydroxide and aluminum chloride, and natural brine to adhere to the biodegradable base cloth and/or biodegradable fiber layer, there is a method of immersing the biodegradable base cloth and/or biodegradable fiber layer in a suitable dilution of these various substances with water, etc. and then drying it.

However, because these components are present in large amounts at an almost constant ratio in seawater, it is particularly preferable for lower costs and easy quality control in the present invention that the biodegradable weed-preventing sheet is immersed in seawater and dried under sunlight or with hot air, or the biodegradable weed-preventing sheet is impregnated, sprayed, sprinkled or coated with seawater and then dried under sunlight or with hot air.

To solve the object described above, the method of preventing the generation and growth of weeds by use of the biodegradable weed-preventing sheet according to the present invention comprises laying the biodegradable weed-preventing sheet in the ground in order to prevent the generation and growth of weeds from the ground. As a result; the sheet can suitably prevent the generation and growth of weeds while exhibiting naturally mild and slow biodegradation and high durability without adversely affecting the environment during use and after use.

In addition, the method of preventing the generation and growth of weeds by use of the biodegradable weed-preventing sheet according to the present invention comprises previously sprinkling a weed-killer on the ground before preventing the generation and growth of weeds from the ground by laying the biodegradable weed-preventing sheet in the ground, whereby the generation and growth of weeds can further be prevented.

Further, the method of preventing the generation and growth of weeds according to the present invention comprises sprinkling seawater downward on the biodegradable weed-preventing sheet at desired intervals, whereby the sheet can exhibit an excellent effect of preventing the generation and growth of weeds for a longer time.

The biodegradable weed-preventing sheet of the present invention is a sheet for preventing the generation and growth of weeds suitably, and the sheet comprises biodegradable fibers containing coconut fibers formed in the form of a sheet. This weed-preventing sheet has naturally mild and slow biodegradability, extremely high durability, excellent light-shielding properties, suitable water permeability and high mechanical strength, is resistant to damage by dogs, cats, digging by mice and invasion by weed seeds.

That is, in the present invention, biodegradable fibers containing coconut fibers showing high durability and slow biodegradability are formed into a sheet by the method described above, and thus the weatherability, durability and mechanical strength are increased, thus bringing about the action of significantly prolonging the duration of life of the biodegradable weed-preventing sheet.

Further, the biodegradable weed-preventing sheet according to the present invention exhibits naturally mild and slow biodegradability, so it does not adversely affect the, environment during use and when left after use. Further, when the effect of preventing generation and growth of weeds becomes insufficient because of the progress of biodegradation during use, a new biodegradable weed-preventing sheet can be laid thereon and used successively without adversely affecting the environment.

Further, the biodegradable weed-preventing sheet according to the present invention comprises biodegradable fibers containing coconut fibers formed in the form of sheet and thus has significantly improved weatherability, durability and mechanical strength and can endure mechanical strength upon surface treatment of an embankment normal and upon a stretch of construction. As a result, the film is not broken by such mechanical strength, has excellent light-shielding properties and suitable water permeability, is not cleaved by the growing force of vigorously growing plants of Gramineae family represented by Japanese pampas grass, is resistant to breakage by dogs, cats, digging by mice, and invasion by weed seeds, thereby preventing the generation and growth of weeds.

In addition, by coloring the surface of the biodegradable weed-preventing sheet according to the present invention, the appearance of the sheet can be improved in order to improve an effect in design, the time of exchanging the weed-preventing sheet can be easily confirmed during use by observing the degree of discoloration of the colored surface, the light-shielding properties can be improved, and the harmony thereof with the environment can be achieved.

In addition, the biodegradable weed-preventing sheet of the present invention has at least one member selected from salts such as sodium chloride etc., aluminum hydroxide, aluminum chloride, and natural brine, or salts in seawater, adhering to the biodegradable weed-preventing sheet, whereby the growth of weeds can be inhibited further suitably.

The method of preventing the generation and growth of weeds according to the present invention comprises laying the biodegradable weed-preventing sheet in the ground, whereby the generation and growth of weeds from the ground can be prevented effectively.

In addition, the method of preventing the generation and growth of weeds by use of the biodegradable weed-preventing sheet according to the present invention comprises previously sprinkling a weed-killer on the ground before preventing the generation and growth of weeds from the ground by laying the biodegradable weed-preventing sheet in the ground, whereby the generation and growth of weeds can be prevented further effectively.

EXAMPLES

Hereinafter, the biodegradable, weed-killing sheet of the present invention and the method of preventing the generation and growth of weeds by using said sheet are described by reference to the Examples, which however are not intended to limit the present invention.

Test Materials (1) Coconut fibers: The coconut fibers used were fibers (middle pericarp) obtained from a portion containing coconut fibers between a coconut shell and husk in a coconut, which had been immersed in seawater for 6 to 8 months. (2) Biodegradable fibers: Jute hemp was used as the biodegradable fibers. (3) Biodegradable base cloth: Woven fabric made of jute hemp (basis weight, 4750 g/m$^2$; thickness, 0.5 mm) was used as the biodegradable base cloth.

Example 1

A biodegradable fiber layer with a basis weight of 850 g/m$^2$ and a thickness of 12.5 mm was obtained by intertwining the coconut fibers in item (1) above.

Then, a biodegradable fiber base cloth with a basis weight of 4750 g/m$^2$ and a thickness of 0.5 mm was obtained by intertwining the biodegradable fibers in item (2) above.

The biodegradable fiber layer obtained in item (1) above was laid on the biodegradable base cloth obtained in item (2) above and then punched to give a sheet which was then immersed in seawater and dried, whereby the biodegradable, weed-preventing sheet of the present invention (1 m×1 m square, basis weight, 1000 g/m$^2$ thickness, 13 mm) was obtained.

Example 2

A fiber blend consisting of 60% by weight of the coconut fibers in item (1) above and 40% by weight of the jute hemp as biodegradable fibers in item (2) 15 above was laid on both sides of the biodegradable base cloth i.e. the woven fabric made of jute hemp in item (3) above and then punched to give a sheet which was then immersed in seawater and dried, whereby the biodegradable weed-preventing sheet of the present invention (1 m×1 m square, basis weight, 1850 g/m$^2$; thickness, 14 mm) was obtained.

Comparative Example

In the Comparative Example, a conventional, blue-colored waterproof weed-preventing sheet made of polyvinyl chloride (1 m×1 m square, 50 µm) was used.

Each of the weed-preventing sheets in Examples 1 and 2 and in the Comparative Example above was laid in a test ground of 3 m×6 m. After 8 weeks, the state of grown weeds and the state of each weed-preventing sheet were observed to examine the durability and effect of each weed-preventing sheet on prevention of generation and growth of weeds.

The center of each weed-preventing sheet was provided with a cut (1 m×1 m square) through which the ground was exposed in order to compare the effect of the weed-preventing sheet of the present invention on prevention of generation and growth of weeds.

Separately, the durability and effect of each weed-preventing sheet on prevention of generation and growth of weeds were also examined by sprinkling a weed-killer (2,4-D) on a test ground before the weed-preventing sheets in Examples 1 and 2 and in the Comparative Example above were laid in the test ground.

The results of these tests are shown in Table 1.

TABLE 1

| | Spraying of the weed-killer | Effect of preventing generation and growth of weeds | | |
|---|---|---|---|---|
| | | Under the sheet | Binding portion | Cut portion |
| Example 1 | present | ⊚ | ⊚ | Δ |
| | absent | ⊚ | ○ | X |
| Example 2 | present | ⊚ | ⊚ | Δ |
| | absent | ⊚ | ⊚ | X |
| Comparative | present | ○ | Δ | Δ |
| | absent | Δ | X | X |

For the effect of preventing the generation and growth of weeds, ⊚ was given when the generation and growth of weeds were not observed, ○ was given when the generation and growth of certain weeds (plants of Gramineae family, such as Japanese pampas grass) were observed only partially, Δ was given when the effect was hardly confirmed, and x were given when the effect could not confirmed at all.

As is evident from the results shown in Table 1, the biodegradable weed-preventing sheets of the present invention in Examples 1 and 2 have an excellent effect of preventing the. generation and growth of weeds regardless of whether the weed-killer was sprinkled or not.

On the other hand, the weed-preventing sheet in the Comparative Example was cleaved during use by dogs and cats digging and by plants of Gramineae family, such as Japanese pampas grass, and the generation of weeds was confirmed.

A few weeds of Gramineae family were confirmed to grow in the binding portions of the laid biodegradable weed-preventing sheet of the present invention in Example 1 on which the weed-killer had not been sprinkled, but the growth of weeds was not observed even in the binding portions of the laid sheet in Example 1 on which the weed-killer had been sprinkled, or of the laid biodegradable weed-killing sheet in Example 2.

Whether puddles occurred on the sheet in the test ground upon violent. thunderstorm was observed with eyes. As a result, no puddle was confirmed on the sheets in Examples 1 and 2, while a large number of puddles were confirmed on the sheet in the Comparative Example.

Further, the degrees of light shielding of the sheets in Examples 1 and 2 and in the Comparative Example were measured by the method of Japan Chemical Fibers Examination Association, indicating 89.5% in Example 1, 96.5% in Example 2 and 82.5% in the Comparative Example.

This weed-preventing sheet of the present invention has the constitution described above, and this weed-preventing sheet has naturally mild and slow biodegradability and thus extremely high durability, has excellent light-shielding properties, suitable water permeability high mechanical strength, resistant to damage by dogs, cats, digging by mice and invasion by weed seeds.

That is, in the biodegradable weed-preventing sheet of the present invention, biodegradable fibers containing coconut fibers showing high durability and slow biodegradability are formed into a sheet, and thus the weatherability, durability and mechanical strength are increased, thus bringing about the action of significantly prolonging the duration of life of the biodegradable weed-preventing sheet.

Further, the biodegradable weed-preventing sheet according to the present invention exhibits naturally mild and slow biodegradability, so it does not adversely affect the environment during use and when left after use. Further, when the effect of the sheet on prevention of generation and growth of weeds becomes insufficient because of the progress of biodegradation during use, a new biodegradable weed-preventing sheet can be laid thereon and used successively without adversely affecting the environment.

Further, the biodegradable weed-preventing sheet according to the present invention comprises biodegradable fibers containing coconut fibers formed in the form of sheet and thus has significantly improved weatherability, durability and mechanical strength and can endure mechanical strength upon surface treatment of an embankment normal and upon a stretch of construction. As a result, the film is not broken during stretch for construction, has excellent light-shielding properties, suitable water permeability, is not cleaved by the growing force of vigorously growing plants of Gramineae family represented by Japanese pampas grass, is resistant to breakage by dogs, cats, digging by mice and invasion by weed seeds, thereby preventing the generation and growth of weeds.

In addition, by coloring the surface of the biodegradable weed-preventing sheet according to the present invention, the appearance of the sheet can be improved in order to improve an effect in design, the time of exchanging the weed-preventing sheet can be easily confirmed during use by observing the degree of discoloration of the colored surface, the lightshielding properties can be improved, and the harmony thereof with the environment can be achieved.

In addition, the biodegradable weed-preventing sheet of the present invention has at least one-member selected from salts such as sodium chloride, aluminum salts such as aluminum hydroxide and aluminum chloride, and natural brine, or salts in seawater, adhering to the biodegradable weed-preventing sheet, whereby the growth of weeds can be inhibited further effectively.

The method of preventing the generation and growth of weeds according to the present invention comprises laying the biodegradable weed-preventing sheet in the ground, whereby the generation and growth of weeds from the ground can be prevented effectively.

In addition, the method of preventing the generation and growth of weeds by use of the biodegradable weed-preventing sheet according to the present invention comprises previously sprinkling a weed-killer on the ground before preventing the generation and growth of weeds from the ground by laying the biodegradable weed-preventing sheet in the ground whereby the generation and growth of weeds can be prevented further effectively.

What is claimed is:

1. A biodegradable weed-preventing sheet consisting essentially of coconut fibers as biodegradable nongerminating fibers, optionally, other biodegradable nongerminating fibers, and optionally, a polymeric cementing material for cementing said biodegradable fibers.

2. The biodegradable weed-preventing sheet according to claim 1, wherein the biodegradable fibers consist of a fiber blend of greater than or equal to 30 wt. % coconut fibers with the remainder biodegradable fibers other than coconut fibers.

3. The biodegradable weed-preventing sheet according to claim 2, wherein the biodegradable fibers other than coconut fibers are at least one fiber selected from the group consisting of natural biodegradable fibers, synthetic biodegradable fibers, and combinations thereof.

4. The biodegradable weed-preventing sheet according to claim 3, wherein the biodegradable fibers other than coconut fibers are at least one vegetable or animal fiber selected from the group consisting of cotton, kapok, jute hemp, manila hemp, sisal hemp, silk, camel hair, alpaca, wool, mohair and cashmere.

5. The biodegradable weed-preventing sheet according to any one of claims 1 to 4, wherein the biodegradable fibers are formed into a non-woven fabric, woven fabric or a knitted web.

6. The biodegradable weed-preventing sheet according to any one of claims 1 to 4, wherein said cementing material is present.

7. The biodegradable weed-preventing sheet according to claim 6, wherein the polymeric material is 10 to 200 parts by weight relative to 100 parts by weight of the biodegradable fibers.

8. The biodegradable weed-preventing sheet according to claim 5 wherein the biodegradable weed-preventing sheet has a basis weight of between 1250 to 2500 g/m$^2$ and a thickness of 7.5 to 50 mm.

9. The biodegradable weed-preventing sheet according to any one of claims 1 to 4, wherein the biodegradable fibers have a salt from the group consisting of sodium chloride, aluminum hydroxide, aluminum chloride, and natural brine and combinations thereof adhered thereto.

10. A biodegradable weed-preventing sheet consisting essentially of:
a biodegradable base cloth, said biodegradable base cloth having opposed first and second sides, and
a layer of biodegradable fibers laminated on at least one of said first and second sides, said layer of biodegradable fibers consisting essentially of coconut fibers, optionally other biodegradable nongerminating fibers, and optionally a polymeric cementing material for cementing said biodegradable fibers.

11. A biodegradable weed-preventing sheet comprising:
a layer of biodegradable fibers, consisting essentially of coconut fibers optionally other biodegradable nongerminating fibers; and optionally a polymeric cementing material for cementing said biodegradable fibers, said layer having opposed first and second sides, and
a biodegradable base cloth on each of said first and second sides.

12. The biodegradable weed-preventing sheet according to claim 10 or 11, wherein the biodegradable fibers are a fiber blend consisting of coconut fibers greater than or equal to 30 wt. % and biodegradable fibers other than coconut fibers.

13. The biodegradable weed-preventing sheet according to claim 12, wherein the biodegradable fibers other than coconut fibers are selected from the group consisting of natural fibers, synthetic biodegradable fibers and combinations thereof.

14. The biodegradable weed-preventing sheet according to claim 13, wherein the biodegradable fibers other than coconut fibers are natural fibers, said natural fibers being vegetable and animal fibers selected from the group consisting of cotton, kapok, jute hemp, manila hemp, sisal hemp, silk, camel hair, alpaca, wool, mohair, cashmere and combinations thereof.

15. A biodegradable weed-preventing sheet consisting essentially of:
a biodegradable base cloth, said biodegradable base cloth having opposed first and second sides, and
a layer of biodegradable fibers laminated on at least one of said first and second sides of said biodegradable base cloth, said layer of biodegradable fibers consisting of coconut fibers.

16. A biodegradable weed-preventing sheet comprising:
a layer of biodegradable fibers, said layer of biodegradable fibers consisting of coconut fibers and having opposed first and second sides, and
a biodegradable base cloth on each of the first and second sides of said layer of biodegradable fibers.

17. The biodegradable weed-preventing sheet according to any one of claims 10, 15 or 16, wherein said layer of biodegradable fibers is formed into a non-woven fabric, woven fabric or a knitted web.

18. The biodegradable weed-preventing sheet according to any one of claims 10, 15 or 16 wherein said biodegradable base cloth is a non-woven fabric, woven fabric or knitted web formed from biodegradable fibers.

19. The biodegradable weed-preventing sheet according to any one of claims 10, 15 or 16 wherein said biodegradable base cloth is formed from a natural material.

20. The biodegradable weed-preventing sheet according to claim 19, wherein the natural material does not degrade for a prolonged period of time.

21. The biodegradable weed-preventing sheet according to claim 19, wherein the natural material comprises vegetable or animal fibers selected from the group consisting of coconut fibers, cotton, kapok, jute hemp, manila hemp, sisal hemp, silk, camel hair, alpaca, wool, mohair and cashmere and combinations thereof.

22. A biodegradable weed-preventing sheet formed by laminating at least two layers, each of said at least two layers consisting of the biodegradable weed-preventing sheet as claimed in any one of claims 1 to 4, 10, 11, 15 or 16.

23. The biodegradable weed-preventing sheet according to any one of claims 1 to 4, 10, 11, 15 or 16, wherein the biodegradable weed-preventing sheet is colored on at least a surface thereof.

24. The biodegradable weed-preventing sheet according to any one of claims 10, 11, 15 or 16, wherein the biodegradable base cloth has a salt from the group consisting of sodium chloride, aluminum hydroxide, aluminum chloride, natural brine, and combinations thereof adhered thereto.

25. The biodegradable weed-preventing sheet according to any one of claims 10, 11, 15 or 16, wherein the layer of biodegradable fibers and the biodegradable base cloth have a salt from the group consisting of sodium chloride, aluminum hydroxide, aluminum chloride, and natural brine and combinations thereof adhered thereto.

26. A biodegradable weed-preventing sheet made by a process comprising the steps of:
   1) immersing in a salt solution a sheet consisting essentially of biodegradable nongerminating material, said biodegradable nongerminating material comprising biodegradable fibers, wherein the biodegradable fibers are coconut fibers, and
   2) drying said sheet to permit salts in the salt solution to adhere thereto.

27. A biodegradable weed-preventing sheet made by a process comprising the steps of:
   1) impregnating, spraying, sprinkling or coating with a salt solution a sheet, said sheet consisting essentially of biodegradable nongerminating material, said biodegradable nongerminating material comprising biodegradable fibers, wherein the biodegradable fibers are coconut fibers, and
   2) drying said sheet to permit salts in the salt solution to adhere thereto.

28. A method of preventing generation and growth of weeds comprising the steps of:
   laying a biodegradable weed-preventing sheet in a medium capable of growing weeds to prevent generation and growth of weeds from the medium, said biodegradable weed-preventing sheet consisting essentially of coconut fibers as biodegradable nongerminating fibers, optionally other biodegradable nongerminating fibers, and optionally, a polymeric cementing material for cementing said fibers.

29. A method of preventing generation and growth of weeds comprising the steps of:
   1) sprinkling a weed-killer on the ground, and then
   2) laying a biodegradable weed-preventing sheet on a medium capable of growing weeds, said biodegradable weed-preventing sheet consisting essentially of biodegradable nongerminating material, said biodegradable nongerminating material consisting essentially of biodegradable fibers, wherein the biodegradable fibers are coconut fibers.

30. A method of preventing generation and growth of weeds comprising the steps of:
   laying a biodegradable weed-preventing sheet in a medium capable of growing weeds to prevent generation and growth of weeds from the medium, said biodegradable weed-preventing sheet comprising a biodegradable base cloth, said base cloth having opposed first and second sides, and
   a layer of biodegradable fibers laminated on at least one of said first and second sides, said layer of biodegradable fibers consisting of coconut fibers.

31. The method of preventing generation and growth of weeds according to claim 28 or 30, further comprising the step of sprinkling a salt solution downward onto the biodegradable weed-preventing sheet at predetermined time intervals.

32. A biodegradable weed-preventing sheet made by a process comprising the steps of:
   1) immersing in a salt solution, a sheet, said sheet comprising a biodegradable base cloth, said biodegradable base cloth having opposed first and second sides, and
   a layer of biodegradable fibers laminated on at least one of said first and second sides, said layer of biodegradable fibers consisting of coconut fibers, and
   2) drying said sheet to permit salts in the salt solution to adhere thereto.

33. A biodegradable weed-preventing sheet made by a process comprising the steps of:
   1) impregnating, spraying, sprinkling or coating with a salt solution a sheet, said sheet comprising a biodegradable base cloth, said biodegradable base cloth having opposed first and second sides, and
   a layer of biodegradable fibers laminated on at least one of said first and second sides, said layer of biodegradable fibers consisting of coconut fibers, and
   2) drying said sheet to permit salts in the salt solution to adhere thereto.

34. The biodegradable weed-preventing sheet of claims 26, 27, 32 or 33, wherein the salt solution comprises seawater.

35. A method of preventing generation and growth of weeds comprising the steps of:
   1) sprinkling a weed-killer on the ground, and then
   2) laying a biodegradable weed-preventing sheet on a medium capable of growing weeds, said biodegradable weed-preventing sheet comprising a biodegradable base cloth, said biodegradable base cloth having opposed first and second sides, and
   a layer of biodegradable fibers laminated on at least one of said first and second sides, said layer of biodegradable fibers consisting of coconut fibers.

* * * * *